US012637894B2

(12) United States Patent
Yun et al.

(10) Patent No.: US 12,637,894 B2
(45) Date of Patent: May 26, 2026

(54) SLIDING-DOOR DRIVE UNIT FOR A VEHICLE

(71) Applicants: HYUNDAI MOTOR COMPANY, Seoul (KR); KIA CORPORATION, Seoul (KR); PYEONG HWA AUTOMOTIVE CO., LTD., Daegu (KR)

(72) Inventors: Hyung-In Yun, Seoul (KR); So-Yeon Park, Seoul (KR); Jong-Han Woo, Hwaseong-si (KR); Ki-Hwan Jeong, Hwaseong-si (KR); Soo-Chul Lee, Suwon-si (KR); Moon-Gyu Choi, Incheon (KR); Seong-Tae Hong, Suwon-si (KR)

(73) Assignees: HYUNDAI MOTOR COMPANY, Seoul (KR); KIA CORPORATION, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 242 days.

(21) Appl. No.: 18/387,323

(22) Filed: Nov. 6, 2023

(65) Prior Publication Data

US 2025/0003279 A1 Jan. 2, 2025

(30) Foreign Application Priority Data

Jun. 30, 2023 (KR) ........................ 10-2023-0085082

(51) Int. Cl.
*H02P 7/03* (2016.01)
*E05F 15/657* (2015.01)
(Continued)

(52) U.S. Cl.
CPC ............... *E05F 15/657* (2015.01); *B60J 5/06* (2013.01); *E05Y 2201/216* (2013.01);
(Continued)

(58) Field of Classification Search
CPC ............ H02K 3/50; H02K 3/522; H02K 5/10; H02K 5/141; H02K 5/22; H02K 7/06;
(Continued)

(56) References Cited

U.S. PATENT DOCUMENTS

| 2005/0160674 A1* | 7/2005 | Noro | ...................... E05F 15/646 |
| | | | 49/360 |
| 2005/0253414 A1* | 11/2005 | Yokomori | .................. B60J 5/06 |
| | | | 296/146.4 |
| 2011/0227436 A1* | 9/2011 | Ishida | ...................... F16D 27/06 |
| | | | 310/78 |

FOREIGN PATENT DOCUMENTS

KR 20180115020 A 10/2018

* cited by examiner

*Primary Examiner* — David Luo
*Assistant Examiner* — Charles S Laughlin
(74) *Attorney, Agent, or Firm* — Lempia Summerfield Katz LLC

(57) ABSTRACT

A sliding-door drive unit for a vehicle is capable of transferring or blocking drive power required to pull or push a cable to open or close a sliding door. The sliding-door drive unit includes a worm wheel rotatable by a drive motor, a stationary disc coupled to an output shaft, and a movable disc rotatably installed between the worm wheel and the stationary disc along an axial direction of the output shaft. The movable disc is engaged with the worm wheel and is selectively engaged with the stationary disc.

16 Claims, 11 Drawing Sheets

(51) Int. Cl.
 *H02P 29/40*       (2016.01)
 *B60J 5/06*       (2006.01)

(52) U.S. Cl.
 CPC ... *E05Y 2201/246* (2013.01); *E05Y 2201/264* (2013.01); *E05Y 2201/654* (2013.01); *E05Y 2201/664* (2013.01); *E05Y 2201/702* (2013.01); *E05Y 2201/704* (2013.01); *E05Y 2900/531* (2013.01)

(58) Field of Classification Search
 CPC . H02K 7/11; H02K 7/112; H02K 7/14; H02K 11/27; H02P 29/40; H02P 7/03
 See application file for complete search history.

SLIDING-DOOR DRIVE UNIT FOR A VEHICLE

CROSS-REFERENCE TO RELATED APPLICATION

This application claims priority to Korean Patent Application No. 10-2023-0085082, filed on Jun. 30, 2023, which is incorporated herein by reference in its entirety.

BACKGROUND

Field of the Disclosure

The present disclosure relates to a sliding-door drive unit for a vehicle, and more particularly, to a sliding-door drive unit for a vehicle which may transfer or block a drive power required to pull or push a cable to open or close a sliding door.

Description of Related Art

A door through which an occupant gets in and out of a vehicle is installed on a lateral surface of the vehicle.

As illustrated in FIGS. 1-3, a sliding door 2 that slides to open and close is installed on a vehicle 1, such as a van. A rail 1a along which the sliding door 2 slides is installed on a body of the vehicle 1. A roller that runs along the rail 1a is installed on the sliding door 2. A door lock that locks the sliding door 2 when the sliding door 2 closes is installed.

In recent years, for the convenience of an occupant, a so-called "power sliding door" that opens and closes using drive power of a drive motor has found an increasing range of applications.

A drive unit 10 is installed inside the sliding door 2. The drive unit 10 includes a drive motor 12, first and second cables 22 and 23, first and second pulley units 24 and 25, and the like. The first and second cables 22 and 23 push or pull the sliding door 2. The pulley switches directions of the first and second cables 22 and 23. The first cable 22 and the second cable 23 are wound around a drum 21 that rotates by the drive motor 12. The rotation of the drum 21 winds or unwind the first cable 22 and the second cable 23, enabling the sliding door 2 to slide.

A clutch (not shown) that transfers drive power of the drive motor 12 to the drum 21 or blocks the transfer of the drive power of the drive motor 12 to the drum 21 is provided inside the drive unit 10. When the drive motor 12 and the drum 21 are engaged with each other by the clutch, the drum 21 operates by the drive motor 12, enabling the sliding door 2 to operate in an electrically powered driving mode. When the drive motor 12 and the drum 21 are disengaged from each other by the clutch, an occupant manually opens or closes the sliding door 2 in a manual mode.

A position of the clutch is variable by an electromagnet and a spring that are installed inside the drive unit 10. Thus, the drive motor 12 and the drum 21 are enabled to be engaged with or disengaged from each other. When the drive power is transferred from the drive motor 12 to the drum 21 through the clutch, the electromagnet causes the clutch to come into contact with a worm wheel connected to the drive motor 12. This contact generates friction, enabling the transfer of the drive power. Since the drive power is transferred with the friction between the clutch and the worm wheel, a problem arises due to a loss in the drive power caused by slippage between the clutch and the worm wheel.

In order to provide a solution to this problem, the drive motor 12 needs to increase an output thereof to compensate for the loss in the drive power or needs to increase the friction between the clutch and the worm wheel. To this end, the strength of the electromagnet needs to be increased, or a contact area between the clutch and the worm wheel needs to be increased.

However, these methods cause an increase in the size of the drive unit 10, leading to a problem of increased manufacturing costs for the drive unit 10. The increase in the size of the drive unit 10 also increases the size of the space that is occupied by the drive unit 10 inside the sliding door 2, leading to an increase in the thickness of the sliding door 2 or interference with another constituent element installed inside the sliding door 2.

Moreover, even when the output of the drive motor 12, the strength of the electromagnet, and the contact area between the clutch and the worm wheel are increased, the loss in the drive power may still occur between the clutch and the worm wheel during the passage of time.

SUMMARY

An object of the present disclosure, which is made to find a solution to the above-mentioned problems, is to provide a sliding-door drive unit for a vehicle capable of providing engagement during fastening in such a manner as to improve the efficiency of the drive power transfer, thereby reducing the size of a driving unit driving a vehicle sliding door.

In order to accomplish the above-mentioned object, according to an aspect of the present disclosure, a sliding-door drive unit for a vehicle is provided. The drive unit includes: a worm wheel rotatable by a drive motor; a stationary disc coupled to an output shaft; and a movable disc rotatably installed between the worm wheel and the stationary disc along an axial direction of the output shaft. The movable disc is engaged with the worm wheel and selectively engaged with the stationary disc.

In the sliding-door drive unit for a vehicle, an accommodation groove may be formed in the worm wheel and in which the movable disc is accommodated and which comes into contact with a circumference of the movable disc in an inward direction. The movable disc may slide toward the axial direction of the output shaft inside the accommodation groove and thus may be engaged with or disengaged from the stationary disc.

In the sliding-door drive unit for a vehicle, blocking protrusions may be formed on the accommodation groove in the worm wheel in a spaced-apart manner along a circumference of the worm wheel and may protrude toward a rotational center of the worm wheel. Blocking grooves may be formed in the movable disc along a circumference thereof and the blocking protrusions are accommodated in the blocking grooves, respectively. The blocking protrusions may be inserted into the blocking grooves, respectively, leading to engagement of the worm wheel and the movable disc with each other.

In the sliding-door drive unit for a vehicle, a support may be formed on the circumference of each of the blocking grooves in the movable disc and may protrude to a predetermined height from a surface of the movable disc in such a manner as to support the blocking protrusions, respectively, when the blocking protrusions are inserted into the blocking grooves.

In the sliding-door drive unit for a vehicle, one or more engagement protrusions may be formed on a surface of the movable disc, and one or more engagement grooves in which the one or more engagement protrusions are accommodated may be formed in a surface of the stationary disc. The surfaces of the movable disc and the stationary disc face each other.

In the sliding-door drive unit for a vehicle, the one or more engagement protrusions may be formed on the surface of the movable disc in a manner that protrude toward the stationary disc. The one or more engagement grooves in which the one or more engagement protrusions are accommodated may be formed in the stationary disc. Additionally, when the movable disc moves toward the stationary disc, the one or more engagement protrusions may be inserted into the one or more engagement grooves, leading to engagement of the movable disc with the stationary disc.

In the sliding-door drive unit for a vehicle, the one or more engagement grooves may be formed in such a manner as to be spaced a predetermined angle apart in a circumferential direction of the movable disc or the stationary disc.

In the sliding-door drive unit for a vehicle, the one or more engagement grooves and the one or more engagement protrusions may be formed in such a manner as to be the same in number.

In the sliding-door drive unit for a vehicle, an angle that the one or more engagement protrusions are formed to be spaced apart may be set to a multiple of an angle that the one or more engagement grooves are formed to be spaced apart.

In the sliding-door drive unit for a vehicle, a wave spring that provides elastic support in a direction in which the movable disc is disengaged from the stationary disc may be installed between the stationary disc and the movable disc.

In the sliding-door drive unit for a vehicle, an electromagnet may be installed that moves the movable disc in such a manner that the movable disc is engaged with the stationary disc.

In the sliding-door drive unit for a vehicle, a drum may be fastened to the output shaft and a cable that pulls or pushes a sliding door may be wound around the drum.

In the sliding-door drive unit for a vehicle, when the movable disc is engaged with the stationary disc, the sliding door may open or close with drive power of the drive motor. When the movable disc is disengaged from the stationary disc, the sliding door may manually open or close.

In the sliding-door drive unit for a vehicle, the output shaft may pass through the worm wheel without being coupled thereto.

The sliding-door drive unit for a vehicle according to the present disclosure is configured as described above. In the sliding-door drive unit for a vehicle, the movable disc may be engaged with the stationary disc in a state of being engaged with the worm wheel. Thus, the drive power of the drive motor may be transferred to the cable that pulls or pushes to open or close the sliding door. As a result, a loss in the drive power due to a slippage between the movable disc and the stationary disc can be prevented.

The prevention of the loss in the drive power between the movable disc and the stationary disc eliminates the need to increase an output of the drive motor to compensate for the loss. In addition, the prevention of the loss in the drive power eliminates the need to increase the strength of the electromagnet to bring the movable disc and the stationary disc into close contact with each other.

Moreover, it is possible that the sliding-door drive unit is miniaturized, i.e., smaller than a more traditional drive unit. The sliding-door drive unit takes up less space inside the sliding door. This eliminates the need to increase the thickness of the sliding door. Furthermore, interference with another constituent element inside the sliding door can be avoided.

DETAILED DESCRIPTION

Figure 1:
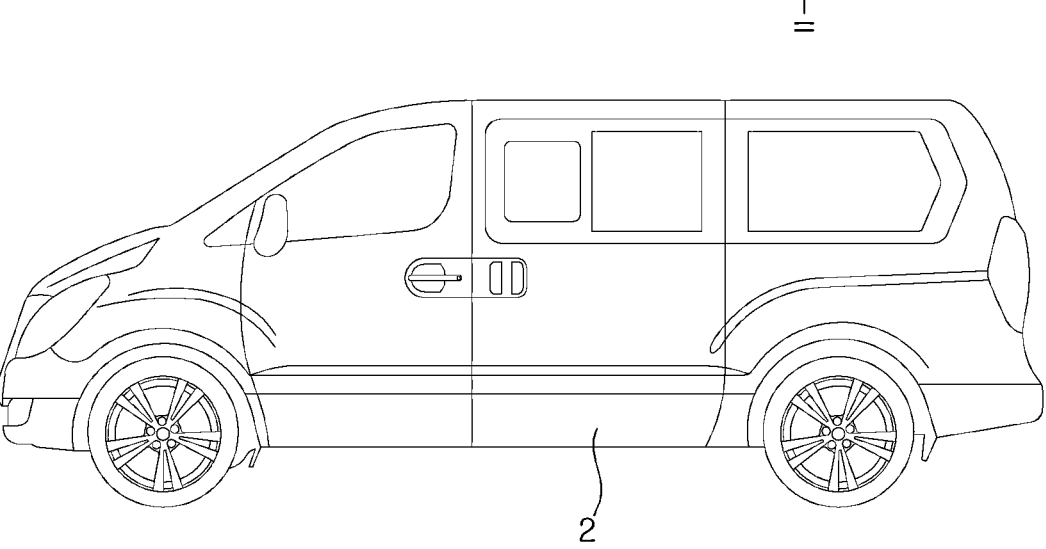
FIG. 1 is a side view illustrating a state where a typical sliding door of the related art is installed.
Figure 2:
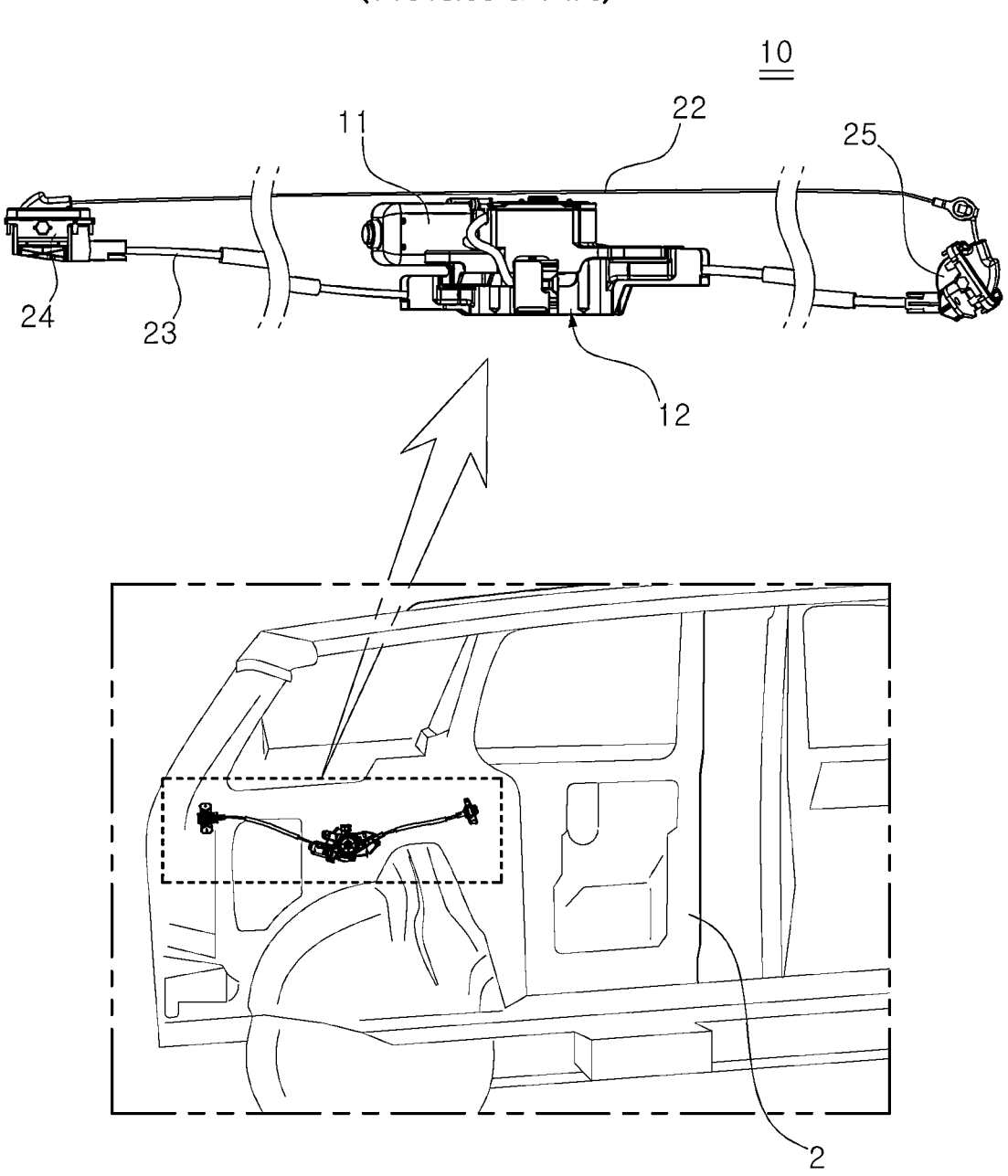
FIG. 2 is a schematic view illustrating a configuration where a drive unit that opens or closes the sliding door is installed inside the typical sliding door of the related art.
Figure 3:
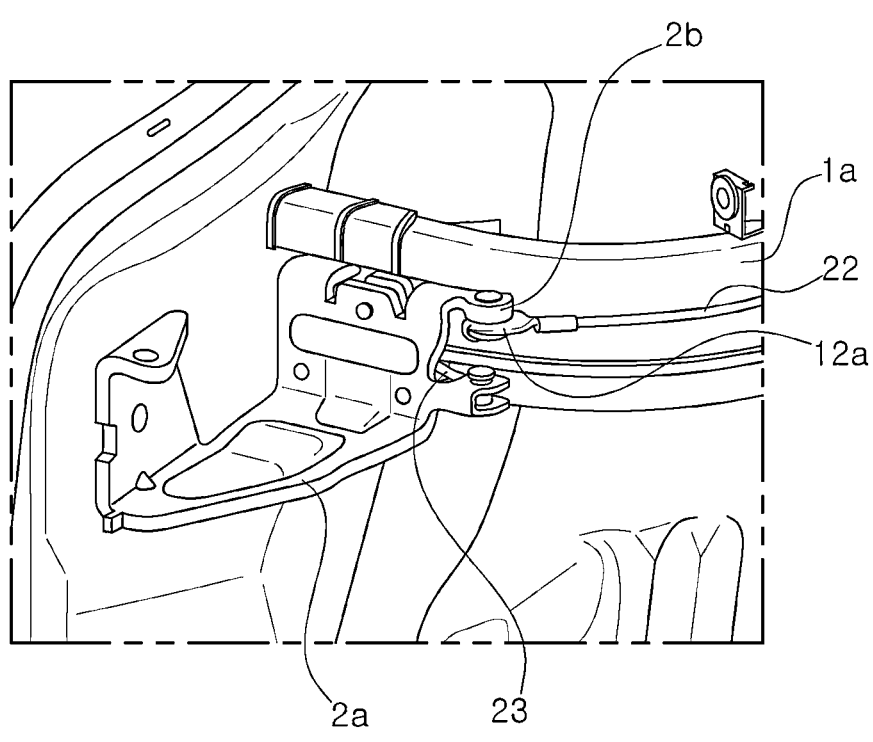
FIG. 3 is a perspective view illustrating a state where a cable is fixed in the typical sliding door of the related art.
Figure 4:
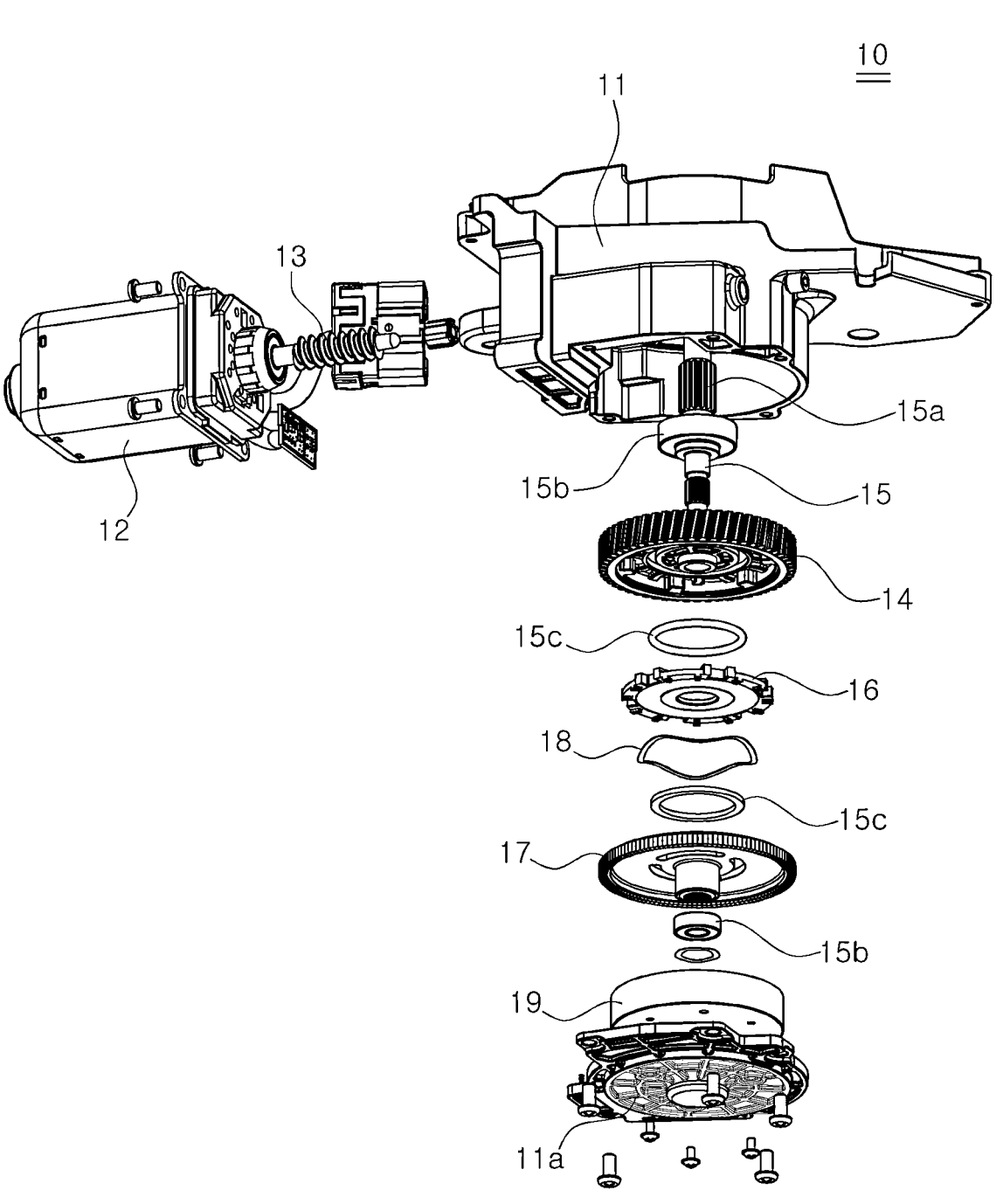
FIG. 4 is an exploded perspective view illustrating a sliding-door drive unit for a vehicle according to the present disclosure.
Figure 5:
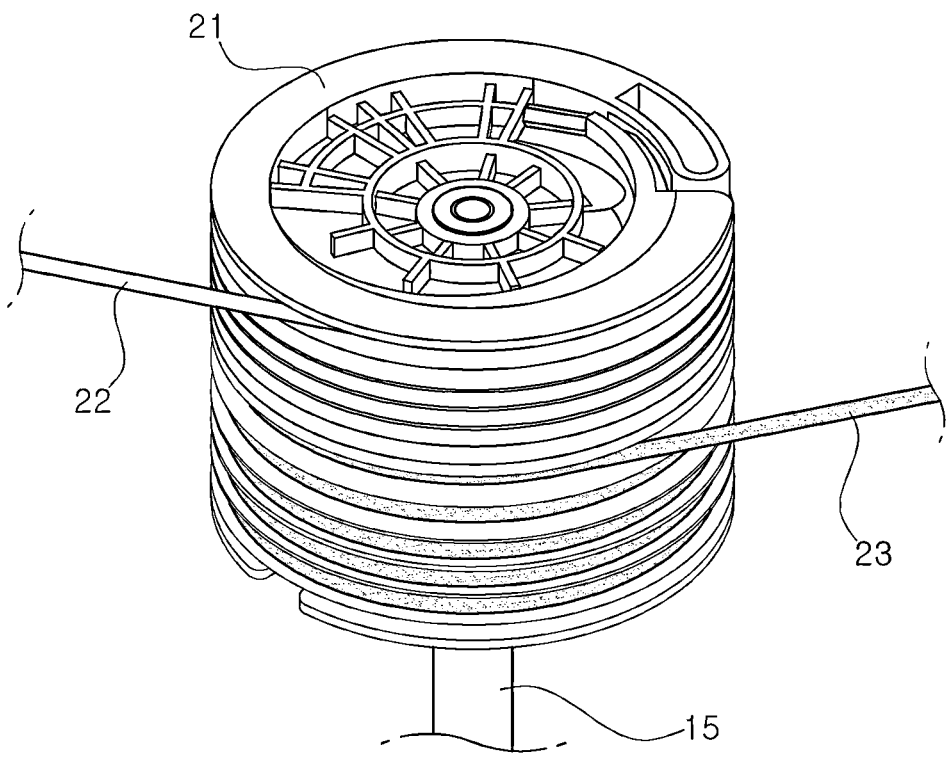
FIG. 5 is a perspective view illustrating a state where a cable is wound around a drum inside the sliding-door drive unit for a vehicle according to the present disclosure.

A sliding-door drive unit 10 for a vehicle according to the present disclosure is described in detail below with reference to the accompanying drawings.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for describing relationships between components, such as, "between" and "directly between" or "adjacent to" and "directly adjacent to", should be interpreted in the same manner.

When a component, device, element, or the like of the present disclosure is described as having a purpose or performing an operation, function, or the like, the component, device, or element should be considered herein as being "configured to" meet that purpose or perform that operation or function.

The sliding-door drive unit 10 (hereinafter referred to as "drive unit 10") for a vehicle according to the present disclosure may include a worm wheel 14, a stationary disc 17, and a movable disc 16. The worm wheel 14 may rotate by a drive motor 12. The stationary disc 17 may be coupled to an output shaft 15 of the drive unit 10. The movable disc 16 may be installed between the worm wheel 14 and the stationary disc 17 in a manner that is slidable along an axial direction of the output shaft 15. Furthermore, the movable disc 16 may be, preferably, always engaged with the worm wheel 14 and may be selectively engaged with the stationary disc 17.

In the case of a vehicle 1 as illustrated in FIG. 1, a sliding door 2 may be installed on a lateral surface of the vehicle 1 and opens and closes. A rail 1a may be installed on one side of the vehicle 1. A roller arm 2a may be fastened to the sliding door 2. As a roller (not illustrated) fastened to the roller arm 2a may slide along the rail 1a, the sliding door 2 slides.

For the convenience of an occupant, the sliding door 2 may open and close in an electrically-driven manner with the drive power of the drive unit 10. Cables 22 and 23 that are pulled by the drive unit 10 may be connected to the roller arm 2a using a cable coupling unit 2b. Thus, the drive unit 10 may pull the cables 22 and 23, thereby moving the roller arm 2a. As a result, the sliding door 2 may open or close. The cables 22 and 23 may be provided as a first cable 22 and the second cable 23, respectively. The first cable 22 and the second cable 23 may serve to move the sliding door 2 toward the front and rear directions, respectively, of the vehicle 1. The first cable 22 and the second cable 23 may be wound around a drum 21 that rotates by the drive unit 10. One of the first cable 22 and the second cable 23 may pull the roller arm 2a along a rotational direction of the drum 21, thereby enabling the sliding door 2 to slide in the forward-backward direction of the vehicle 1. Pulling directions of the cables 22 and 23 may change due to the pulley units 24 and 25, respectively, each of which include an internal pulley.

As described above, the sliding door 2 may slide in an electrically powered driving mode. However, when electric power is not applied to the drive motor 12, such as when a key is turned off or when ignition is turned off, the sliding door 2 may have to slide in a manual mode.

Accordingly, a constituent element for restricting drive power of the drive motor 12 may be provided inside the drive unit 10. As a result, the drive unit 10 may be enabled to operate in the electrically powered driving mode or the manual mode.

To this end, the drive unit 10 may include the worm wheel 14, the stationary disc 17, and the movable disc 16. The worm wheel 14 may rotate by the drive motor 12. The stationary disc 17 may be coupled to the output shaft 15 of the drive unit 10. The movable disc 16 may be installed between the worm wheel 14 and the stationary disc 17 in a manner that is slidable along the axial direction of the output shaft 15. The movable disc 16 may be, preferably, always engaged with the worm wheel 14 and may be selectively engaged with the stationary disc 17. The drive unit 10 may operate in either the electrically powered driving mode or in the manual mode according to whether or not the movable disc 16 and the stationary disc 17 are engaged with each other.

The drive unit 10 may be installed inside a space that is formed by a housing 11 and a cover 11a.

The drive motor 12 may be installed on one side of the housing 11. An output shaft of the drive motor 12 may be formed as a worm shaft 13.

The worm wheel 14 may be rotatably installed inside the housing 11 and may be engaged with the worm shaft 13. Accordingly, the worm wheel 14 rotates by the drive motor 12.

The movable disc 16 may be installed in such a manner as to come into contact with the worm wheel 14 in an inward direction. The movable disc 16 may be accommodated inside the worm wheel 14, and a circumference of the movable disc 16 may be engaged with an inner surface of the worm wheel 14. The worm wheel 14 and the movable disc 16 may be, preferably, always engaged with each other. Blocking protrusions 14b may be formed on an accommodation groove 14a in the worm wheel 14. The blocking protrusions 14b may also be formed in a spaced-apart manner along a circumference of the worm wheel 14 such that the blocking protrusions 14b protrude toward a rotational center of the worm wheel 14. Blocking grooves 16b may be formed in a circumference of the movable disc 16 along a circumferential direction of the movable disc 16 such that the blocking protrusions 14b are accommodated in the blocking grooves 16b, respectively. Each blocking protrusion 14b may be inserted into each respective blocking groove 16b. Thus, the blocking grooves 16b and the blocking protrusions 14b may be respectively engaged with each other, leading to the rotation of the movable disc 16 by the worm wheel 14.

Figure 10:
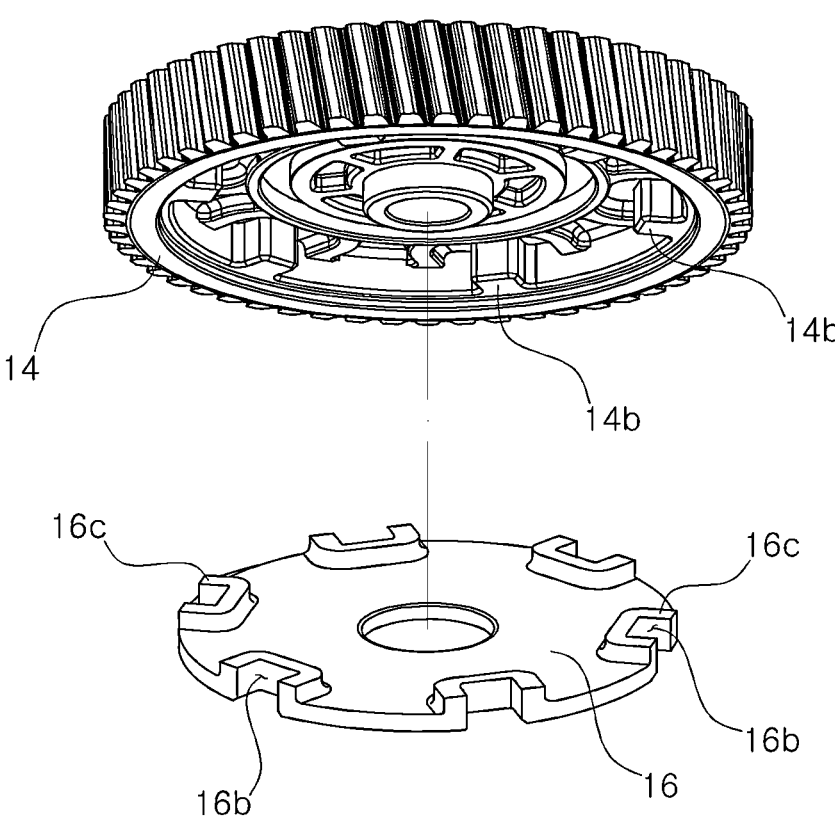
FIG. 10 is a perspective view illustrating a coupling relationship between a worm wheel and the movable disc in the sliding-door drive unit for a vehicle according to the present disclosure.

As illustrated in FIG. 10, a support or raised wall 16c may be formed on a circumference of each blocking groove 16b in the movable disc 16. The support 16c may support the respective blocking protrusion 14b. The support 16c may be formed on the circumference of the blocking groove 16b in a manner that protrudes to a predetermined height from a surface of the movable disc 16. The movable disc 16 may move along an axial direction of the worm wheel 14 inside the accommodation groove 14a. Thus, the blocking groove 16b and the blocking protrusion 14b may not be tightly engaged with each, depending on a position of the movable disc 16. With the support 16c, the blocking groove 16b and the blocking protrusion 14b may be tightly engaged with each other, regardless of the position of the movable disc 16.

Figure 11:
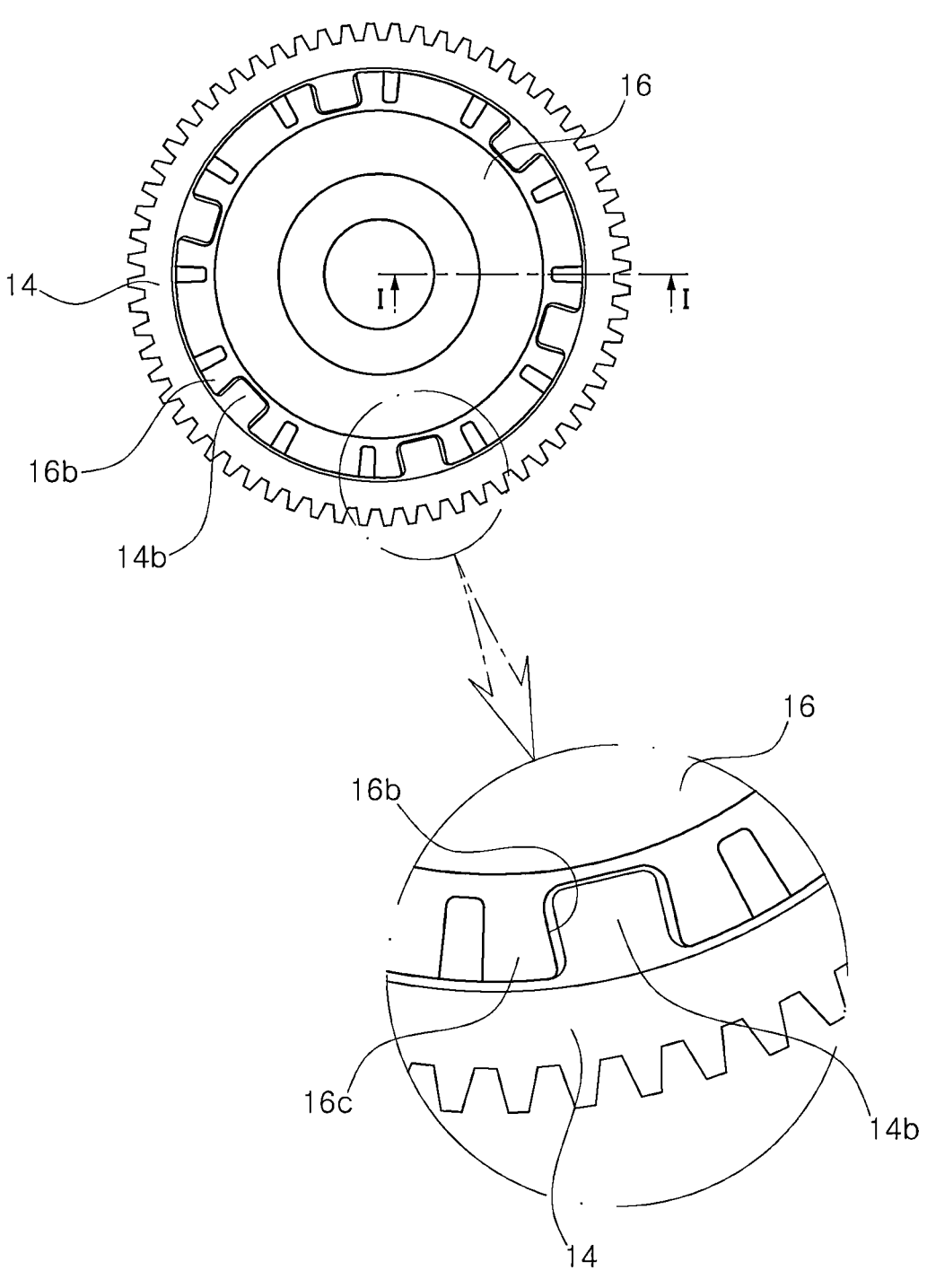
FIG. 11 is a top view illustrating a state where the worm wheel and the movable disc are coupled to each other in the sliding-door drive unit for a vehicle according to the present disclosure.
Figure 12:
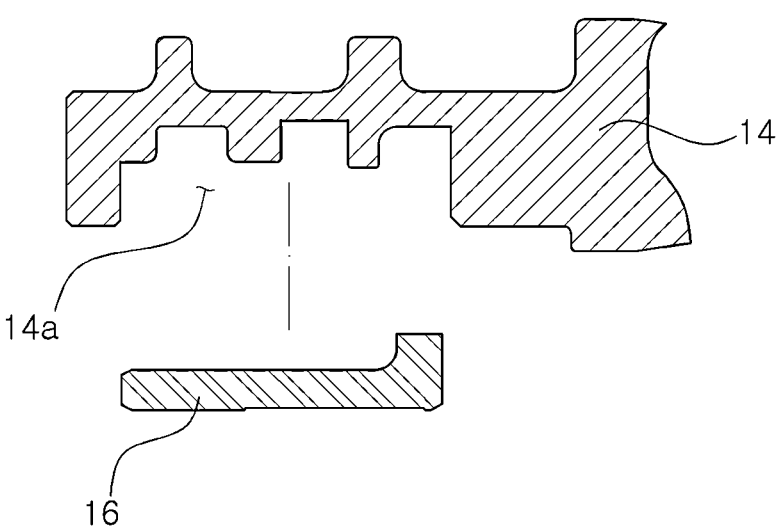
FIG. 12 is a cross-sectional view taken along line I-I on FIG. 11, illustrating a state where the worm wheel and the movable disc are not yet coupled to each other.
Figure 13:
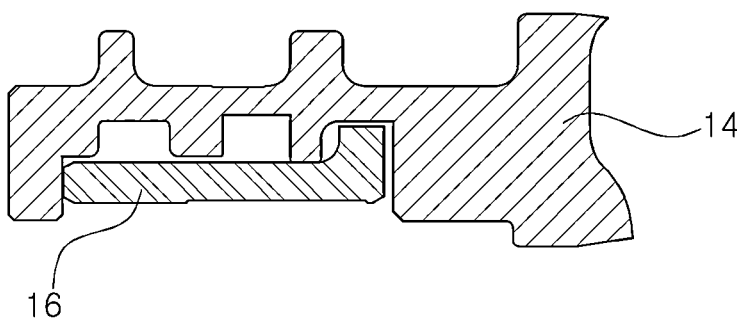
FIG. 13 is a cross-sectional view taken along line I-I on FIG. 11, illustrating a state where the worm wheel and the movable disc are coupled to each other.

As illustrated in FIGS. 11-13, the movable disc is accommodated in the accommodation groove 14a in the worm wheel 14, the movable disc 16 may take up less space necessary for installation thereof. In addition, the movable disc 16 and the worm wheel 14 may be coaxially installed in such a manner that the movable disc 16 and the worm wheel 14 are engaged with each other in an inward direction instead of in an outward direction. Thus, the space necessary for the installation of the movable disc 16 may be also reduced.

The stationary disc 17 may be coupled to the output shaft 15 of the drive unit 10.

The output shaft 15 may be coupled to the drum 21 in a manner that passes through the housing 11. Thus, as the output shaft 15 rotates, the drum 21 may rotate, thereby pulling the cables 22 and 23. The output shaft 15 may pass through the worm wheel 14 without being coupled to the worm wheel 14. Accordingly, the worm wheel 14 may not directly rotate the output shaft 15 and may rotate the output shaft 15 through the movable disc 16 and the stationary disc 17.

The stationary disc 17 may be selectively engaged with the movable disc 16. When the stationary disc 17 is engaged with the movable disc 16, the drive power of the drive motor 12 may be transferred to the output shaft 15 through the worm shaft 13, the worm wheel 14, the movable disc 16, and the stationary disc 17.

An engagement protrusion 16a may be formed on a surface of the movable disc 16, and an engagement groove 17a in which the engagement protrusion 16a is accommodated is formed in a surface of the stationary disc 17. The surfaces of the movable disc 16 and the stationary disc 17 may face each other. As a specific example, the engagement protrusion 16a may be formed on and protrude from a surface of the movable disc 16 in a manner that protrudes toward the stationary disc 17. The engagement groove 17a in which the engagement protrusion 16a is accommodated may be formed in a surface of the stationary disc 17. When the movable disc 16 moves toward the stationary disc 17, the engagement protrusion 16a may be inserted into the engagement groove 17a, leading to the engagement of the movable disc 16 with the stationary disc 17.

Figure 8:
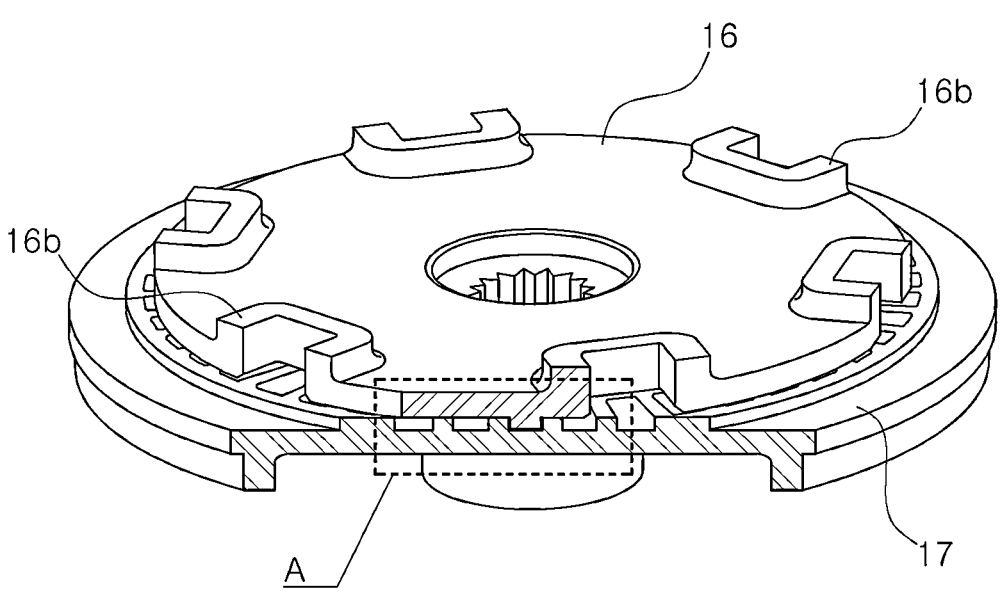
FIG. 8 is a partial vertically cross-sectional perspective view illustrating a state where a movable disc is engaged with a stationary disc in the sliding-door drive unit for a vehicle according to the present disclosure.
Figure 9:
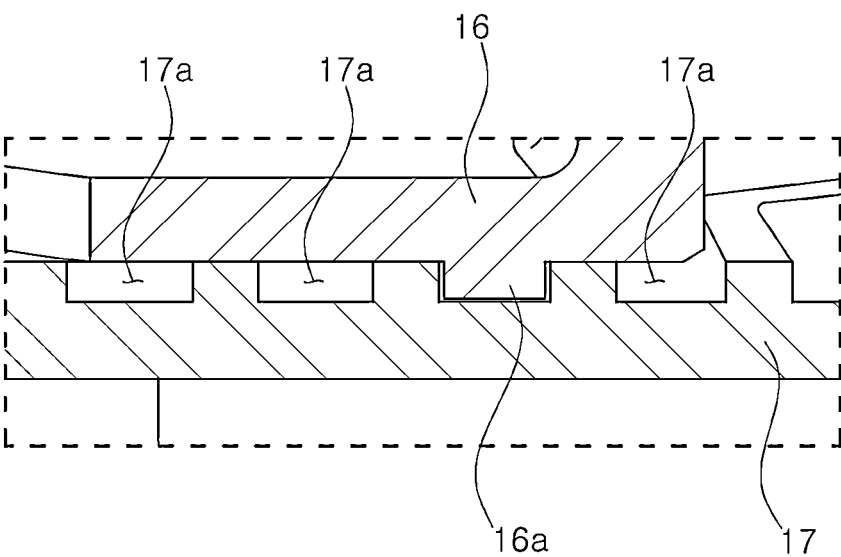
FIG. 9 is an enlarged view illustrating a portion A of FIG. 8.

In another example, a plurality of engagement grooves 17a may be formed in such a manner as to be spaced a predetermined angle apart in a circumferential direction of the stationary disc 17. A plurality of engagement protrusions 16a may also be formed in such a manner as to be spaced apart along the circumferential direction of the movable disc 16. The engagement grooves 17a and the engagement protrusions 16a may be formed in such a manner as to be the same in number. However, the engagement protrusions 16a may also be formed in such a manner as to be smaller in number than the engagement grooves 17a. In other words, the formation of the engagement protrusions 16a in such a manner as to be smaller in number than the engagement grooves 17a can reduce the time and costs that are required to machine the engagement protrusions 16a. FIGS. 8 and 9 illustrate four engagement grooves 17a and one engagement protrusion 16a. The drive unit 10 operates only when the sliding door 2 opens and closes. A small force may be applied to the drive unit 10. For these reasons, even when the engagement protrusions 16a may be formed in such a manner as to be smaller in number than the engagement grooves 17a, the drive power of the drive motor 12 may be sufficiently transferred. When electric power is applied to an electromagnet 19 described below, the resulting magnetic force may be required to force the movable disc 16 to move toward the electromagnet 19. Due to this requirement, the movable disc 16 may be made of metal material. Consequently, the reduction in the number of the engagement protrusions 16a may reduce manufacturing time and costs.

However, an angle that the engagement protrusions 16a are formed to be spaced apart may be set to a multiple of the angle that the engagement grooves 17a are formed to be spaced apart. For example, when it is assumed that 40 engagement grooves 17a are formed in the stationary disc 17, the angle that the engagement protrusions 16a are formed to be spaced apart may be a multiple of 9 degrees, such as 9 degrees, 18 degrees, 27 degrees and so forth. Accordingly, regardless of respective rotational angles of the movable disc 16 and the stationary disc 17, the movable disc 16 may come into close contact with the stationary disc 17. As a result, the engagement protrusions 16a may be immediately inserted into the engagement grooves 17a, leading to the engagement of the movable disc 16 with the stationary disc 17.

In another example, the engagement protrusions 16a may be formed on a surface of the stationary disc 17, and the engagement grooves 17a may be formed in a surface of the movable disc 16.

A spring, preferably a wave spring, also known as a coiled wave spring or scrowave spring (hereinafter referred to as a "wave spring") 18 and the electromagnet 19 may be provided in order that the movable disc 16 is engaged with the stationary disc 17 or disengaged from the stationary disc 17 by moving the movable disc 16 toward the output shaft 15 inside the worm wheel 14.

The wave spring 18 may provide elastic support in a direction in which the movable disc 16 is disengaged from the stationary disc 17. The wave spring 18 may be formed in the shape of a ring in such a manner as to have different heights along a circumference thereof. Thus, the wave spring 18, when installed between the stationary disc 17 and the movable disc 16, may provide the elastic support in the direction in which the stationary disc 17 and the movable disc 16 may be disengaged from each other. In addition, the wave spring 18, when an external force stronger than an elastic force thereof is applied thereto, may be elastically transformed to a flat shape.

The electromagnet 19 may be positioned on an end portion of the output shaft 15. The electromagnet 19, when electric power is applied thereto, may be magnetized. The magnetization of the electromagnet 19 may move the movable disc 16 that is a slidable constituent element, among the constituent elements described above. When the movable disc 16 is disengaged from the stationary disc 17 by the wave spring 18 and when the electromagnet 19 is magnetized, the movable disc 16 may come into close contact with the stationary disc 17, leading to the engagement of the movable disc 16 with the stationary disc 17.

A spline 15a may be formed in the output shaft 15, and the output shaft 15 may be supported by a bearing 15b. Moreover, a damper 15c may be provided on the output shaft 15. The damper 15c may serves as a buffer when the movable disc 16 is disengaged from or engaged with the stationary disc 17.

The sliding-door drive unit 10 for a vehicle according to the present disclosure is configured as described above. Operation thereof is described as follows.

Figure 6:
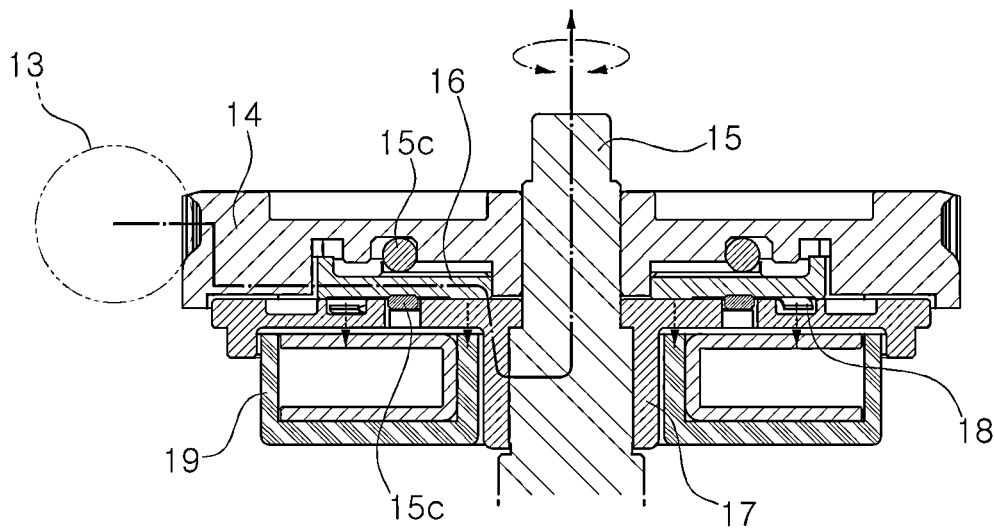
FIG. 6 is a cross-sectional view illustrating a state where drive power is output through the sliding-door drive unit for a vehicle according to the present disclosure.
Figure 7:
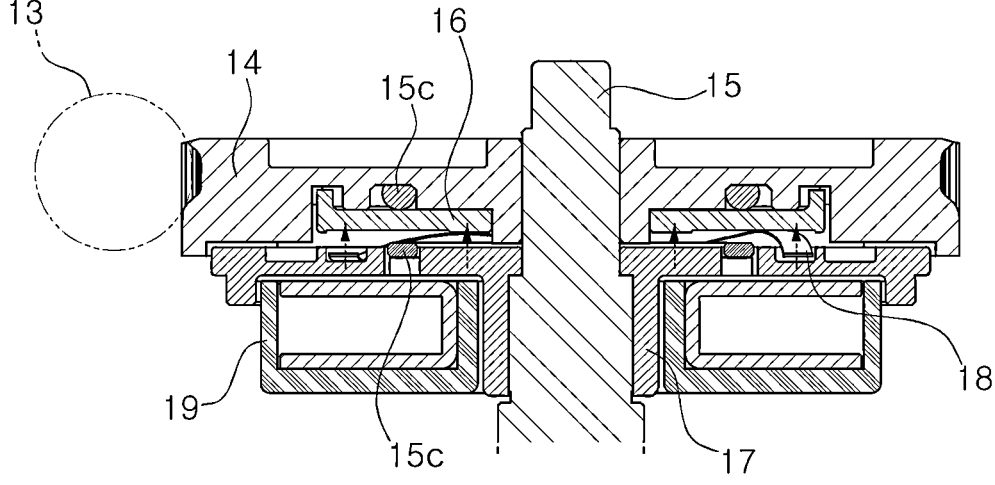
FIG. 7 is a cross-sectional view illustrating a state where the drive power is output in a sliding door in which the sliding-door drive unit for a vehicle according to the present disclosure is used.

FIG. 6 is a cross-sectional view illustrating the drive unit 10 that operates in a state where electric power is applied to the electromagnet 19. FIG. 7 is a cross-sectional view illustrating the drive unit 10 that operates in a state where electric power is not applied to the electromagnet 19.

FIG. 6 illustrates an example where the drive unit 10 operates in the electrically powered driving mode.

Electric power may be applied to the electromagnet 19 when the drive unit 10 is enabled to operate in the electrically powered driving mode. When electric power is applied to the electromagnet 19, the electromagnet 19 may be magnetized. This magnetization may move the movable disc 16 toward the electromagnet 19. The movable disc 16 may move from the accommodation groove 14a in the worm wheel 14 toward the axial direction of the output shaft 15. The movement of the movable disc 16 toward the electromagnet 19 may compress the wave spring 18. As a result, the engagement protrusions 16a on the movable disc 16 may be inserted into the engagement grooves 17a in the stationary disc 17, leading to the engagement of the movable disc 16 with the stationary disc 17. Since the movable disc 16 is engaged with the stationary disc 17, it is possible that drive power is transferred from the movable disc 16 to the stationary disc 17.

At this point, when electric power is applied to the drive motor 12, the drive power of the drive motor 12 may be transferred to the output shaft 15 through the worm shaft 13, the worm wheel 14, the movable disc 16, and the stationary disc 17. Since the drum 21 is fastened to the output shaft 15, the drum 21 may open or close the sliding door 2 by pulling the cables 22 and 23. To open or close the sliding door 2, a rotational direction of the drive motor 12 may switch, enabling the forward or backward movement of the sliding door 2.

FIG. 7 illustrates an example where the drive unit 10 operates in the manual mode.

When electric power is not applied to the electromagnet 19 and thus, a magnetic force may be not generated, the electromagnet 19 may not move the movable disc 16. The wave spring 18 may provide the elastic support in such a manner that the movable disc 16 is disengaged from the stationary disc 17. Thus, when no electric power is supplied to the electromagnet 19, the movable disc 16 may be disengaged from the stationary disc 17. When the movable disc 16 is disengaged from the stationary disc 17, the stationary disc 17 and the output shaft 15 may be in a state of being rotatable independently of the drive motor 12 or the movable disc 16.

At this point, when the occupant manually moves the sliding door 2 forward or backward, as the sliding door 2 moves, the cables 22 and 23 may rotate the drum 21, as opposed to the electrically powered driving mode. As a result, the output shaft 15 and the stationary disc 17 may rotate. Since the stationary disc 17 is in a state of being disengaged from the movable disc 16, even when the occupant moves forward or backward the sliding door 2, the drive unit 10 may not restrict this movement. As a result, the sliding door 2 may move forward or backward according to the occupant's intention.

What is claimed is:

1. A sliding-door drive unit for a vehicle, the sliding-door drive unit comprising:
a worm wheel rotatable by a drive motor;
a stationary disc connected to an output shaft of the sliding-door drive unit; and
a movable disc rotatably installed between the worm wheel and the stationary disc along an axial direction of the output shaft,
wherein the movable disc is engaged with the worm wheel and selectively engaged with the stationary disc;
wherein engagement protrusions are formed on a surface of the movable disc,
wherein engagement grooves in which the engagement protrusions are accommodated are formed in a surface of the stationary disc,
wherein the surfaces of the movable disc and the stationary disc face each other,
wherein the engagement grooves are formed to be spaced a predetermined angle apart in a circumferential direction of the stationary disc,
wherein the engagement protrusions are formed in such a manner as to be smaller in number than the number of engagement grooves, and
wherein an angle by which the engagement protrusions are spaced apart is set to a multiple of an angle by which the engagement grooves are spaced apart.

2. The sliding-door drive unit of claim 1, wherein an accommodation groove is formed in the worm wheel in which the movable disc is accommodated and which comes into contact with a circumference of the movable disc in an inward direction, and
wherein the movable disc slides toward the axial direction of the output shaft inside the accommodation groove and is engaged with or disengaged from the stationary disc.

3. The sliding-door drive unit of claim 2, wherein:
blocking protrusions are formed on the accommodation groove in the worm wheel in a spaced-apart manner along a circumference of the worm wheel and protrude toward a rotational center of the worm wheel;
blocking grooves are formed in the movable disc along a circumference thereof and the blocking protrusions are accommodated in the blocking grooves, respectively; and
the blocking protrusions are inserted into the blocking grooves, respectively, leading to engagement of the worm wheel and the movable disc with each other.

4. The sliding-door drive unit of claim 3, wherein a support is formed on a circumference of each of the blocking grooves in the movable disc and protrudes to a predetermined height from a surface of the movable disc so as to support a blocking protrusion when the blocking protrusions are inserted into the blocking grooves.

5. The sliding-door drive unit of claim 1, wherein:
the engagement protrusions are formed on the surface of the movable disc in a manner that protrude toward the stationary disc; and
when the movable disc moves toward the stationary disc, the engagement protrusions are inserted into the engagement grooves, leading to engagement of the movable disc with the stationary disc.

6. The sliding-door drive unit of claim 1, wherein a spring provides elastic support in a direction in which the movable disc is disengaged from the stationary disc and is installed between the stationary disc and the movable disc.

7. The sliding-door drive unit of claim 1, wherein an electromagnet is installed and can move the movable disc such that the movable disc is engaged with the stationary disc.

8. The sliding-door drive unit of claim 1, wherein a drum is fastened to the output shaft and a cable that pulls or pushes a sliding door is wound around the drum.

9. The sliding-door drive unit of claim 8, wherein:
when the movable disc is engaged with the stationary disc, the sliding door opens or closes with drive power of the drive motor; and
when the movable disc is disengaged from the stationary disc, the sliding door manually opens or closes.

10. The sliding-door drive unit of claim 1, wherein the output shaft passes through the worm wheel without being coupled thereto.

11. A sliding-door drive unit for a vehicle, the sliding-door drive unit comprising:
a housing;
a drive motor provided in the housing to rotate a drum wound with cables;
a worm wheel coupled with a worm shaft of the drive motor;
a stationary disc coupled to the drum;
a movable disc rotatably installed between the worm wheel and the stationary disc; and
a spring to elastically support the movable disc to be disengaged from the stationary disc,
wherein the movable disc is configured to be engaged with the worm wheel and selectively engaged with the stationary disc to rotate the drum-;
wherein engagement protrusions are formed on a surface of the movable disc,
wherein engagement grooves in which the engagement protrusions are accommodated are formed in a surface of the stationary disc, wherein the surfaces of the movable disc and the stationary disc face each other, wherein the engagement grooves are formed to be spaced a predetermined angle apart in a circumferential direction of the stationary disc, wherein the engagement protrusions are formed in such a manner as to be smaller in number than the number of engagement grooves, and wherein an angle by which the engagement protrusions are spaced apart is set to a multiple of an angle by which engagement grooves are spaced apart.

12. The sliding-door drive unit of claim 11, further comprising an electromagnet for moving the movable disc to be engaged with the stationary disc when electric power is applied thereto.

13. The sliding-door drive unit of claim 12, wherein the movable disc is installed in the worm wheel to come into contact with the worm wheel in an inward direction, and wherein a circumference of the movable disc is engaged with an inner surface of the worm wheel.

14. The sliding-door drive unit of claim 11, wherein the movable disc is always engaged with the worm wheel and is selectively engaged with the stationary disc to rotate the drum.

15. The sliding-door drive unit of claim 14, wherein an engagement protrusion is formed on a surface of the movable disc and an engagement groove in which the engagement protrusion is accommodated is formed in a surface of the stationary disc.

16. The sliding-door drive unit of claim 13, wherein the movable disc and the worm wheel are coaxially installed in the housing.

\* \* \* \* \*